US012632618B2

(12) United States Patent
Li et al.

(10) Patent No.: US 12,632,618 B2
(45) Date of Patent: May 19, 2026

(54) OVERFLOW BRICK AND GROOVE BOTTOM CURVE DESIGN OPTIMIZATION METHOD THEREFOR

(71) Applicant: CAIHONG DISPLAY DEVICES COMPANY LIMITED, Xianyang (CN)

(72) Inventors: Miao Li, Xianyang (CN); Menghu Li, Xianyang (CN); Lihua Xu, Xianyang (CN); Dacheng Wang, Xianyang (CN)

(73) Assignee: CAIHONG DISPLAY DEVICES COMPANY LIMITED, Xianyang (CN)

( * ) Notice: Subject to any disclaimer, the term of this patent is extended or adjusted under 35 U.S.C. 154(b) by 1109 days.

(21) Appl. No.: 17/687,713

(22) Filed: Mar. 7, 2022

(65) Prior Publication Data

US 2022/0188484 A1    Jun. 16, 2022

Related U.S. Application Data

(63) Continuation of application No. PCT/CN2020/117168, filed on Sep. 23, 2020.

(30) Foreign Application Priority Data

Sep. 29, 2019    (CN) .......................... 201910937080.6

(51) Int. Cl.
*G06F 30/20* (2020.01)
*C03B 17/06* (2006.01)
(Continued)

(52) U.S. Cl.
CPC .............. *G06F 30/20* (2020.01); *C03B 17/06* (2013.01); *C03B 17/064* (2013.01); *G06F 30/28* (2020.01);
(Continued)

(58) Field of Classification Search
CPC ...... G06F 30/20; G06F 30/28; G06F 2111/10; G06F 2119/18; C03B 17/06; C03B 17/064; Y02P 40/57
See application file for complete search history.

(56) References Cited

U.S. PATENT DOCUMENTS 3,338,696 A * 8/1967 Dockerty .............. C03B 17/064
65/129
2001/0039814 A1* 11/2001 Pitbladdo .............. C03B 17/064
65/195
(Continued)

FOREIGN PATENT DOCUMENTS

CN        101955315 A       1/2011
CN        106477858 A    *  3/2017   ............. C03B 17/06
(Continued)

OTHER PUBLICATIONS

Lin, H., Chang, W., "Design of a sheet forming apparatus for overflow fusion process by numerical simulation", 2007, Journal of Non-Crystalline Solids, vol. 353, Issues 30-31, pp. 2817-2825 (Year: 2007).*
(Continued)

*Primary Examiner* — John E Johansen
*Assistant Examiner* — Emily Gorman Leathers

(57) ABSTRACT

Provided is a groove bottom curve design optimization method for an overflow brick, including: S1: obtaining a standard output of the overflow brick based on design parameters; S2: obtaining an initial groove bottom curve of the overflow brick based on the design parameters and the standard output; S3: obtaining a groove bottom curve of the overflow brick through straight line correction of the initial groove bottom curve based on a length of a splitting block; S4: obtaining an extreme thickness difference of a formed glass substrate through overflow simulation based on the groove bottom curve and the design parameters; and S5:
(Continued)

when the extreme thickness difference is smaller than or equal to a preset threshold, processing the overflow brick using the groove bottom curve and the design parameters; and when the extreme thickness difference is greater than the preset threshold, adjusting the design parameters and repeating steps S1 to S4.

12 Claims, 3 Drawing Sheets

(51) Int. Cl.
$$\begin{array}{ll} \textit{G06F 30/28} & (2020.01) \\ \textit{G06F 111/10} & (2020.01) \\ \textit{G06F 119/18} & (2020.01) \end{array}$$

(52) U.S. Cl.
CPC ....... *G06F 2111/10* (2020.01); *G06F 2119/18* (2020.01); *Y02P 40/57* (2015.11)

(56) References Cited

U.S. PATENT DOCUMENTS

| | | | |
|---|---|---|---|
| 2003/0029199 A1* | 2/2003 | Pitbladdo | C03B 17/067 |
| | | | 65/195 |
| 2005/0268659 A1 | 12/2005 | Rhoads | |
| 2007/0144210 A1 | 6/2007 | Pitbladdo | |
| 2015/0132527 A1 | 5/2015 | Gambino et al. | |
| 2019/0092673 A1 | 3/2019 | Feenaughty et al. | |

FOREIGN PATENT DOCUMENTS

| | | |
|---|---|---|
| CN | 108996894 A | 12/2018 |
| CN | 109657263 A | 4/2019 |
| CN | 110174256 A | 8/2019 |
| CN | 110750883 A | 2/2020 |
| JP | 2008501609 A | 1/2008 |
| JP | 2017530929 A | 10/2017 |
| TW | M450568 U1 | 4/2013 |

OTHER PUBLICATIONS

English Translation of CN106477858A (Year: 2017).*

Hou, Y., Cheng, J., Kang, J., Li, H., Cui, J., and Cui, J., "Simulation of the glass melt flowing during the slit down draw process", 2017, IOP Conference Series: Materials Science and Engineering, vol. 274, doi: 10.1088/1757-899X/274/1/012080 (Year: 2017).*

Hou, Y., Cheng, J., Kang, J., Cui, J., Xue, X., and Zuo, D., "Effect of Parameters of Isopipe on the Quality of Glass Sheet Produced from Overflow Fusion Process by Numerical Simulation", 2017, MATEC Web Conferences, vol. 95, doi.org/10.1051/matecconf/20179510006 (Year: 2017).*

Tiwari, A., Mondal, S., Kumar, P. Agarwal, H. Dixit, S., and Sharma, S., âAnalysis of Design Parameters of the Isopipe On The Quality Of Glass Produced From The Overflow Fusion Processa, 2011, Proc. of Int. Conf. on Advances in Mechanical Engineering (Year: 2011).*

Haitao Li et al., "Design of a new kind of curved groove on geneva mechanism", Journal of China Agricultural University, 2005, 10 (6), pp. 62-65.

Xin Chen et al., "Effect of overflow tailings properties on cemented paste backfill", Journal of Environmental Management, 235 (2019), pp. 133-144.

Decision of Refusal dated Nov. 7, 2023 received in corresponding patent family application No. JP2022520028. English translation attached.

Notice of Reasons for Refusal in Japanese Patent Application No. 2022-520028, dated May 9, 2023.

* cited by examiner

OVERFLOW BRICK AND GROOVE BOTTOM CURVE DESIGN OPTIMIZATION METHOD THEREFOR

CROSS-REFERENCE TO RELATED APPLICATIONS

The present application is a continuation of International Application No. PCT/CN2020/117168, filed on Sep. 23, 2020, which claims priority to Chinese Patent Application No. 201910937080.6, filed on Sep. 29, 2019, the entire contents of which are incorporated herein by their references.

TECHNICAL FIELD

The present disclosure relates to the field of manufacture of glass substrates, particularly to an overflow brick and a groove bottom curve design optimization method therefor.

BACKGROUND

Generally, glass substrates used in the field of manufacture of flat panel displays such as Thin Film Transistor Liquid Crystal Display (TFT-LCD) and Plasma Display Panel (PDP) are manufactured by the down drawing method, in which the glass liquid molten by a glass melting furnace is supplied to the molten overflow downdraw forming apparatus in the forming process.

The manufacture of displays requires larger and larger glass substrates to increase the production efficiency and lower the cost, but for a larger glass substrate, its manufacture may face more difficulties and its quality control may be more complicated. An overflow brick is one of the essential members of the apparatus for manufacture of glass substrates. The control for the uniformity of the thickness of the glass substrate is one of the most important processes. Taking the glass substrate with a thickness of 0.7 mm as example, the fluctuation in its thickness must be controlled within 20 μm or 30 μm. The structural design of the overflow brick and the process tolerance are key factors affecting the stability of the forming process, and the forming process such as flow rate and temperature is adjusted according to flow rate and stability control at distal and proximal edge plates of the overflow brick and an initial overall thickness distribution to avoid transient variation in glass extraction mass distribution and thermal distribution, that is, when manufacturing glass substrates that are stable in performances and have stringent requirements on characteristics such as stress, warp, thickness, and plate bending by using the down drawing method, the control for the thickness and the thickness uniformity of the glass substrates is one of the most important design and process technologies. Since the glass substrate is very thin, any process fluctuation in the manufacturing process, including fluctuations in the air flow and thermal field, may have an influence on the thickness of the formed glass substrate, causing that the thickness distribution of the manufactured glass substrate fails to satisfy the requirements, which then causes negative influence on the quality of the display. Thus, when designing the overflow brick, the influences of the above-mentioned factors on the thickness distribution of the glass substrate must be considered, that is, a manufacture tolerance must be added in design, and accordingly, it is generally required that the extreme thickness difference of the overall glass substrate be smaller than 15 μm.

How to guarantee that the thickness distribution of the glass substrate meets the requirements is one of the important process control and quality management programs and has become one of the toughest problems in the manufacturing of the glass substrate.

SUMMARY

The present disclosure aims to provide an overflow brick and a groove bottom curve design optimization method therefor, in order to overcome the above-described shortcoming in the related art that the thickness distribution of the glass substrate manufactured by the down drawing process usually fails to meet the requirements.

To this end, the present disclosure adopts the following technical solutions for implementation.

A groove bottom curve design optimization method for an overflow brick, including:

S1: obtaining a standard output of the overflow brick based on design parameters of the overflow brick;

S2: obtaining an initial groove bottom curve of the overflow brick based on the design parameters of the overflow brick and the standard output of the overflow brick;

S3: obtaining a groove bottom curve of the overflow brick through straight line correction of the initial groove bottom curve of the overflow brick based on a length of a splitting block of the overflow brick;

S4: obtaining an extreme thickness difference of a formed glass substrate through overflow simulation based on the groove bottom curve of the overflow brick and the design parameters of the overflow brick; and S5: when the extreme thickness difference of the formed glass substrate is smaller than or equal to a preset threshold, processing the overflow brick based on the groove bottom curve of the overflow brick and the design parameters of the overflow brick; and when the extreme thickness difference of the formed glass substrate is greater than the preset threshold, adjusting the design parameters of the overflow brick and repeating steps S1 to S4.

The present disclosure provides the following further improvements.

In the step S1, the design parameters of the overflow brick are obtained based on a production line and a product design, and comprise a groove inlet height, a groove inlet width, a length of an overflow surface, an inclination angle of an overflow weir, and a design output of the overflow brick.

In the step S1, the standard output of the overflow brick is obtained specifically by a method including:

S101: calculating a fluid parameter A of an overflow of a glass in accordance with an equation (1):

$$A = \frac{\rho \times g}{3 \times \eta},\tag{1}$$

where ρ represents a density of the glass, in unit of Kg/m³; g represents an acceleration of gravity, in unit of m/s²; and η represents a forming viscosity of the glass, in unit of poise;

S102: calculating a surface tension parameter B of the glass in accordance with an equation (2):

$$B = \operatorname{Sin}(j) \tag{2}$$

3 where represents a contact angle of the glass;

S103: calculating a standard flow rate C per unit length of an overflow surface of the overflow brick in accordance with an equation (3):

$$C = \frac{Q_s}{2 \times L},$$
(3)

where $Q_s$ represents the standard output of the overflow brick, in unit of kg/s; and L represents a length of the overflow surface, in unit of mm;

S104: calculating an overflow height D of an overflow groove in accordance with an equation (4):

$$D = \sqrt[3]{\frac{C}{A \times B}},$$
(4)

S105: calculating a height-width ratio E of the overflow groove in accordance with an equation (5):

$$E = \frac{H + D}{W},$$
(5)

where H represents a groove inlet height of the overflow brick, and W represents an inlet width of the overflow groove of the overflow brick;

S106: calculating a section function F of the overflow groove in accordance with an equation (6):

$$F = 0.6274 \times \tanh\left(\frac{\pi}{4 \times E}\right) + 0.002581893 \times \tanh\left(\frac{3 \times \pi}{4 \times E}\right) + 0.000257234;$$
(6)

S107: calculating the standard output $Q_s$ of the overflow brick in accordance with an equation (7):

$$Q_s = A \times \tan \phi \times [W \times (H+D)^3 - 2 \times F \times (H+D)^4]$$
(7); and S108: obtaining the standard output $Q_s$ of the overflow brick by solving the equations (1) to (7) simultaneously.

The standard output $Q_s$ of the overflow brick is greater than the design output $Q_d$ of the overflow brick.

The contact angle of the glass is j=21.7°, and the forming viscosity of the glass is η=35000 poise.

The step S2 specifically includes:

S201: dividing the length L of the overflow surface of the overflow brick into n equal portions each of which corresponds to a Z value of a groove bottom position, where the Z value is selected from discrete values from 0 to L with an equal interval of L/n, and n is greater than or equal to 5; and S202: obtaining a height h of the overflow groove of the overflow brick corresponding to the Z value corresponding to each of the n equal portions of the length L of the overflow surface of the overflow brick by solving the equations (1) to (8) simultaneously, and recording the height h, to obtain an initial groove bottom curve of the overflow brick:

$$2 \times C \times (L - Z) = A \times \tan \phi_0 \times [W \times (h+D)^3 - 2 \times F \times (h+D)^4]$$
(8), where $\phi_0$ represents an inclination angle of an overflow weir of the overflow brick.

4

The step S3 specifically includes:

S301: dividing, based on a length $L_0$ of the splitting block of the overflow brick, the length L of the overflow surface of the overflow brick into two sections comprising a section from 0 to $L-L_0$ and a section from $L-L_0$ to L;

S302: dividing the initial groove bottom curve of the overflow brick obtained in step S2 into two sections comprising a section from 0 to $L-L_0$ and a section from $L-L_0$ to L, wherein $Z=Z_{L-L_0}$ corresponds to the height of the overflow groove $h=h_{L-L_0}$, and Z=L corresponds to the height of the overflow groove h=0; and S303: connecting the height of the overflow groove $h=h_{L-L_0}$ corresponding to $Z=_{L-L_0}$ and the height of the overflow groove h=0 corresponding to Z=L into a straight line and performing a straight line correction on the straight line to obtain a groove bottom curve of the overflow brick.

The step S4 specifically includes performing overflow simulation using fluid dynamics simulation software based on the groove bottom curve of the overflow brick and the design parameters of the overflow brick to obtain the extreme thickness difference A of the formed glass substrate.

The step S5 specifically includes: when the extreme thickness difference of the formed glass substrate is smaller than or equal to the preset threshold, processing the overflow brick based on the groove bottom curve of the overflow brick and the design parameters of the overflow brick; and when the extreme thickness difference of the formed glass substrate is greater than the preset threshold, adjusting the inlet width W of the overflow groove of the overflow brick and repeating the step S4, or adjusting the groove inlet height H of the overflow brick and repeating the steps S1 to S4, or adjusting the inlet width W of the overflow groove of the overflow brick and the groove inlet height H of the overflow brick and repeating the steps S1 to S4.

Compared with the related art, the present disclosure has the following beneficial effects.

In the method according to the present disclosure, firstly, design parameters of the overflow brick are determined based on a product line and the product design; then a standard output of the overflow brick is calculated, a groove bottom curve is calculated and designed based on the fluid parameter of the overflow related to the viscosity and density of the glass, the surface tension parameter of the glass, and the overflow height related to the thickness of the overflowed glass on the overflow weir; and then the groove bottom curve is validated and optimized through overflow simulation using fluid software to finally make the initial extreme thickness difference of the overflow brick meet the design objective. The method effectively solves the problem of the fluctuation in thickness of the formed glass substrate, increases the production tolerance in design, makes the thickness of the formed glass substrate meet the requirements, and reduces the complexity in the adjustment of the process, thereby maintaining further stability of the production line.

REFERENCE NUMERALS

1—Overflow brick;
2—Overflow groove;
3—Glass melt feeding device;
4—Root of overflow brick;
5—Splitting block;
6—Initial groove bottom curve of overflow brick;
7—Groove bottom curve of overflow brick.

DESCRIPTION OF EMBODIMENTS

In order to allow those skilled in the art to better understand the technical solutions of the present disclosure, the technical solutions in the embodiments of the present disclosure will be described clearly and completely below with reference to the accompanying drawings in the embodiments. Apparently, the embodiments described are only part of and not all of the embodiments of the present disclosure. All other embodiments obtained by those of ordinary skill in the art based on the embodiments in the present disclosure without inventive effort shall fall into the protection scope of the present disclosure.

It's noted that, the terms such as "first" or "second" in the description, claims, and drawings of the present disclosure are used for distinguish one from another, rather than providing a specific sequence or order. It should be understood that the data used in this way are interchangeable in suitable situations, so that the embodiments of the present disclosure described herein may be implemented in an order rather than those illustrated or described herein. Besides, terms such as "including", "comprising", "having" and any variant thereof are intended for a non-exclusive inclusion, for example, a process, method, system, product or apparatus including a series of steps or units is not necessarily limited to those steps or units listed explicitly, and may further include other steps or units that are not explicitly listed or are inherent to the process, method, system, product or apparatus.

The present disclosure will be described below with reference to the accompanying drawings.

Figure 1:
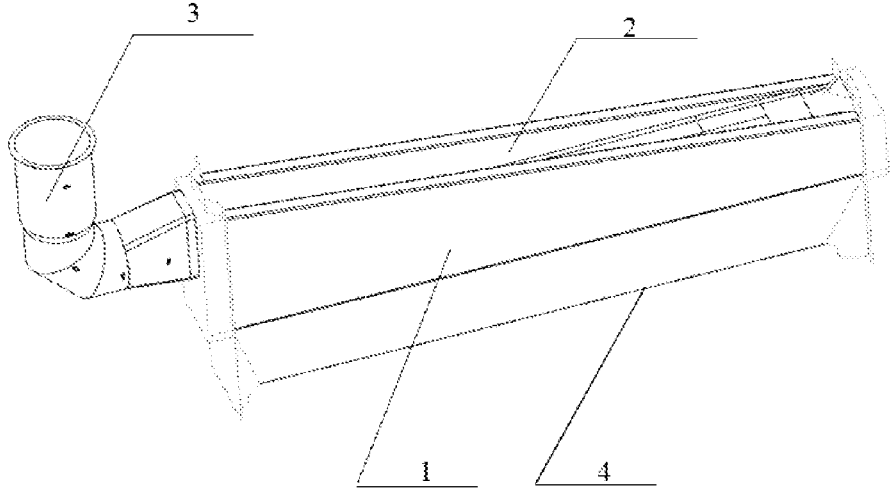
FIG. 1 is a structural schematic diagram illustrating an overflow system.

Referring to FIG. 1, FIG. 1 is a structural schematic diagram illustrating an overflow system formed by connecting an overflow brick 1 and a glass melt feeding device 3. An overflow groove 2 is provided in the overflow brick 1. The bottom of the overflow brick 1 forms a root of the overflow brick 1. When a glass substrate is manufactured in a melt overflow method, the glass melt that has been molten by a glass melting furnace is supplied to the glass melt feeding device 3 in a melt overflow forming apparatus, and overflows along the overflow groove 2 from two sides of the overflow brick 1, to form a glass substrate below the root 4 of the overflow brick 1.

Figure 2:
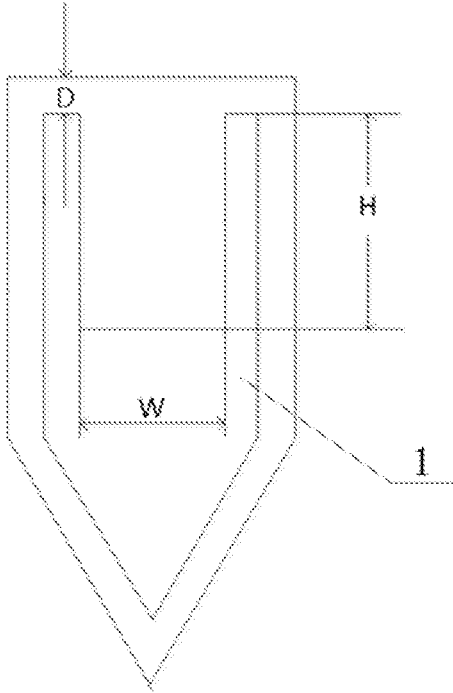
FIG. 2 is a structural schematic diagram illustrating an external appearance of an overflow brick.
Figure 3:
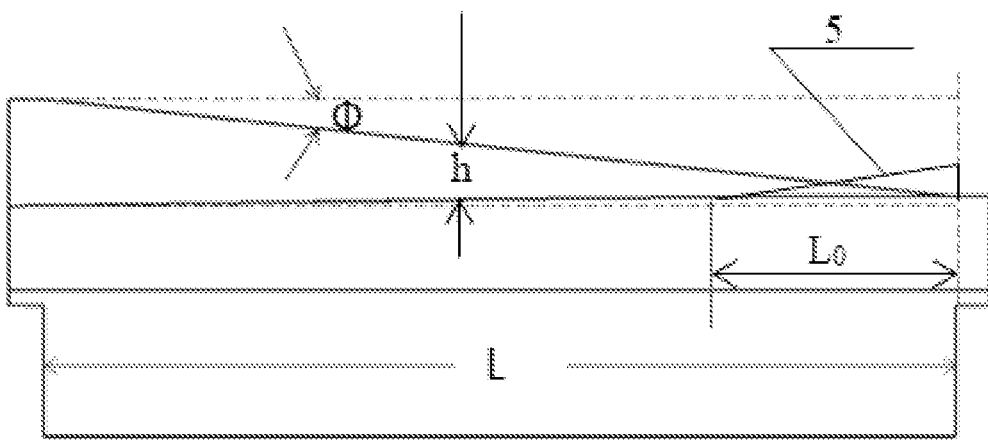
FIG. 3 is a structural schematic diagram illustrating an overflow groove in an overflow brick.

Referring to FIG. 2 and FIG. 3, FIG. 2 is a structural schematic diagram illustrating an external appearance of an overflow brick used in manufacture of the glass substrate by the overflow down drawing method, and FIG. 3 is structural schematic diagram illustrating the overflow groove in the overflow brick. The figures show some key structural design dimensions, including a groove inlet height H, a groove inlet width W, a length L of an overflow surface, an inclination angle $\varnothing_0$ of an overflow weir, an overflow height of the overflow groove, a length $L_0$ of a splitting block 5 of the overflow brick, and a height h of the overflow groove of the overflow brick. In practical manufacture, all overflow bricks include the above parameters, and also include a bottom curve of the overflow groove.

Figure 4:
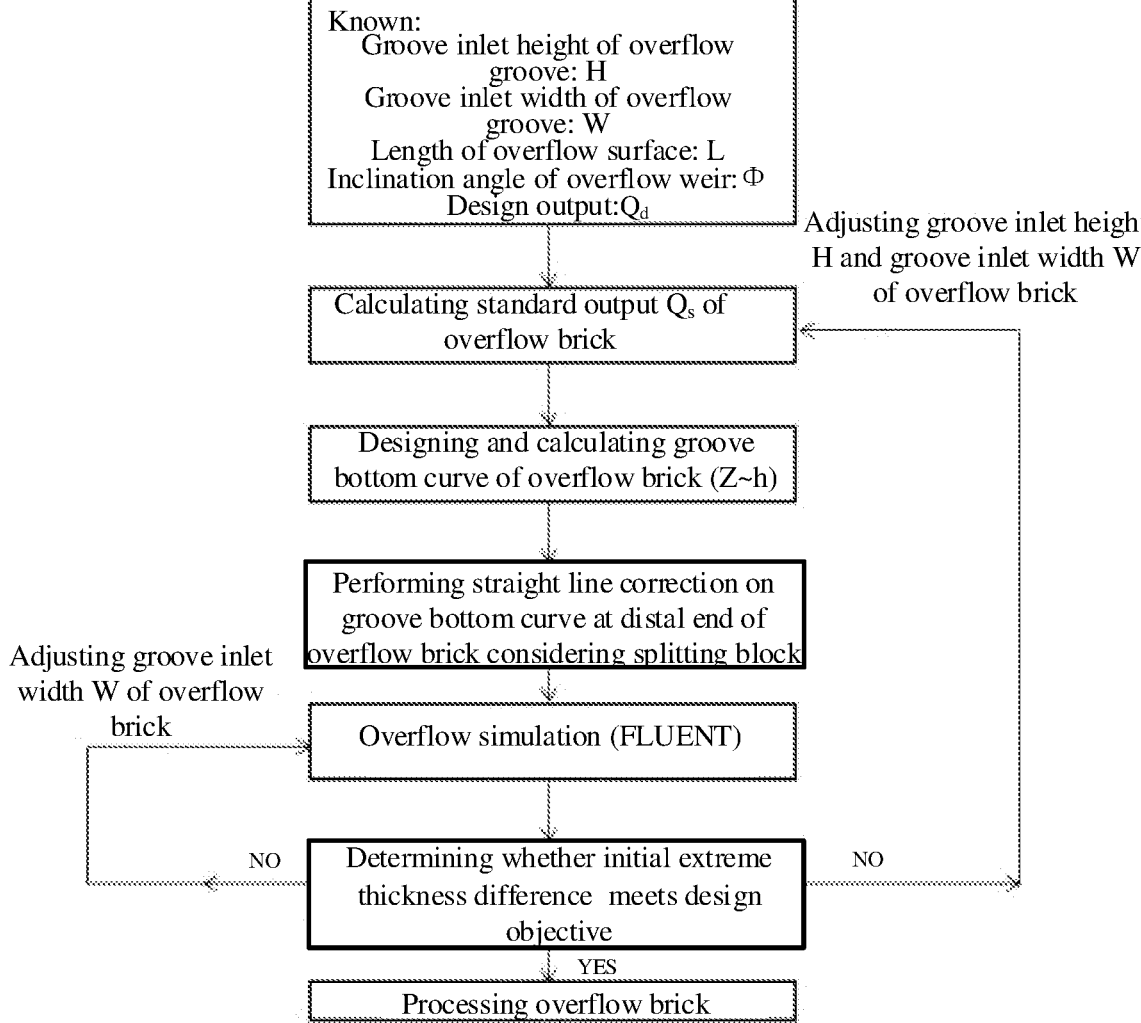
FIG. 4 is a flow block diagram illustrating a groove bottom curve design optimization method for an overflow brick provided by the present disclosure.

Referring to FIG. 4, FIG. 4 is a flow block diagram illustrating design optimization of the bottom curve of the groove in the overflow brick, including following steps: first determining the groove inlet height H of the overflow brick, the groove inlet width W, the length L of the overflow surface, the inclination angle $\varnothing_0$ of the overflow weir, and a design output $Q_d$, etc. based on the production line and the product design; then calculating a standard output $Q_s$ of the overflow brick; designing and calculating a groove bottom curve in conjunction with the overflow fluid parameters related with the viscosity and density of the glass, the surface tension parameter of the glass, and the overflow height related to the thickness of the overflowed glass on the overflow weir, etc.; and performing an overflow simulation using professional fluid software such as ANSYS® Fluent® computational fluid dynamics (CFD) simulation tool to validate and optimize the groove bottom curve, to make an initial extreme thickness difference A of the overflow brick meet the design objective. In one or more embodiments, the following versions of the ANSYS® Fluent® Computational Fluid Dynamics (CFD) simulation tool may be used: Fluent® 6.3, Fluent® 12.0, Fluent® 17.0, Fluent® 2024 RI and so on. Particularly:

S1: a standard output of the overflow brick is obtained based on design parameters of the overflow brick.

Where, the design parameters of the overflow brick in step S1 are acquired from the production line and the product design, including the groove inlet height H, the groove inlet width W, the length L of the overflow surface, the inclination angle θ0 of the overflow weir, and the design output $Q_d$ of the overflow brick.

The standard output of the overflow brick is obtained specifically in the following method.

S101: a fluid parameter A of the glass overflow is calculated in accordance with the equation (1):

$$A = \frac{\rho \times g}{3 \times \eta}, \tag{1}$$

where, ρ represents the density of the glass in unit of $Kg/m^3$; g represents the acceleration of gravity in unit of $m/s^2$, and η represents a forming viscosity of the glass, in unit of poise, usually with a design value of 35000 poise, or other possible design values;

S102: a surface tension parameter B of the glass is calculated in accordance with the equation (2):

$$B = \mathrm{Sin}(j) \tag{2},$$

where, j represents a contact angle of the glass, usually j=21.7°, and a different contact angle may be adopted, depending on the specific glass;

S103: a standard flow rate C per unit length of the overflow surface of the overflow brick is calculated in accordance with the equation (3):

$$C = \frac{Q_s}{2 \times L}. \tag{3}$$

where, $Q_s$ represents the standard output of the overflow brick, in unit of kg/s; and L represents the length of the overflow surface, in unit of mm;

S104: an overflow height D of the overflow groove is calculated in accordance with the equation (4):

$$D = \sqrt[3]{\frac{C}{A \times B}} ; \tag{4}$$

S105: a height-width ratio E of the overflow groove is calculated in accordance with the equation (5):

$$E = \frac{H + D}{W}, \tag{5}$$

where, H represents the groove inlet height of the overflow brick, and W represents the groove inlet width of the overflow brick;

S106: a section function F of the overflow groove is calculated in accordance with the equation (6):

$$F = 0.6274 \times \tanh\left(\frac{\pi}{4 \times E}\right) + 0.002581893 \times \tanh\left(\frac{3 \times \pi}{4 \times E}\right) + 0.000257234; \tag{6}$$

S107: the standard output $Q_s$ of the overflow brick is calculated in accordance with the equation (7):

$$Q_s = A \times \tan \phi \times [W \times (H+D)^3 - 2 \times F \times (H+D)^4] \tag{7};$$

S108: the standard output $Q_s$ of the overflow brick is obtained by solving the equations (1) to (7) simultaneously, where the standard output $Q_s$ of the overflow brick is greater than the design output $Q_d$ of the overflow brick.

S2: an initial groove bottom curve of the overflow brick is obtained based on the design parameters and the design of the standard output of the overflow brick.

S201: the length L of the overflow surface of the overflow brick is divided into n (n≥5) equal portions each of which corresponds to a Z value of a groove bottom position, where the Z value is selected from discrete values from 0 to L with an equal interval of Un; and S202: a height h of the overflow groove of the overflow brick corresponding to the Z value corresponding to each of the n equal portions of the length L of the overflow surface of the overflow brick is obtained by solving the equations (1) to (8) simultaneously, and is recorded, so as to obtain an initial groove bottom curve of the overflow brick:

$$2 \times C \times (L-Z) = A \times \tan \phi_0 \times [W \times (h+D)^3 - 2 \times F \times (h+D)^4] \tag{8}$$

where, $\phi_0$ represents the inclination angle of the overflow weir of the overflow brick.

S3: a groove bottom curve of the overflow brick is obtained through straight line correction of the initial groove bottom curve of the overflow brick based on the length $L_0$ of the splitting block of the overflow brick.

S301: the length L of the overflow surface of the overflow brick is divided, based on the length $L_0$ of the splitting block 5 of the overflow brick, into two sections including a section from 0 to L-$L_0$ and a section from L-$L_0$ to L;

S302: the groove bottom curve of the overflow brick obtained in S2 is divided into two sections including a section from 0 to L-$L_0$ and a section from L-$L_0$ to L, in which Z=$Z_{L-L_0}$ corresponds to the height of the overflow groove h=$h_{L-L_0}$, and Z=L corresponds to the height of the overflow groove h=0; and S303: the height of the overflow groove h=$h_{L-L_0}$ corresponding to Z=$Z_{L-L_0}$ and the height of the overflow groove h=0 corresponding to Z=L are connected into a straight line, and straight line correction is performed on the straight line to obtain a groove bottom curve of the overflow brick.

S4: overflow simulation is performed using fluid dynamics simulation software based on the groove bottom curve of the overflow brick and the design parameters of the overflow brick to obtain an extreme thickness difference A of the formed glass substrate.

S5: when the extreme thickness difference of the formed glass substrate is smaller than or equal to a preset threshold, the overflow brick is processed based on the groove bottom curve of the overflow brick and the design parameters of the overflow brick; and when the extreme thickness difference of the formed glass substrate is greater than the preset threshold, the groove inlet width W of the overflow brick is adjusted and the step S4 is repeated, or the groove inlet height H of the overflow brick is adjusted and the steps S1 to S4 are repeated, or the groove inlet width W of the overflow brick and the groove inlet height H of the overflow brick are adjusted and the steps S1 to S4 are repeated.

In the method according to the present disclosure, firstly, the design parameters of the overflow brick 1 are determined based on the production line and the product design; a standard output of the overflow brick 1 is calculated, a groove bottom curve is calculated and designed in conjunction with the fluid parameter of the overflow related to the viscosity and density of the glass, the surface tension parameter of the glass, and the overflow height related to the thickness of the overflow on the overflow weir, etc., and then the groove bottom curve is validated and optimized through fluid software to finally make the initial extreme thickness difference of the overflow brick meet the design objective. The method effectively solves the problem of the fluctuation in thickness of the formed glass substrate, increases a production tolerance in design, makes the thickness of the formed glass substrate meet the requirements, and reduces the complexity in the adjustment of the process, thereby maintaining further stability of the production line.

Figure 5:
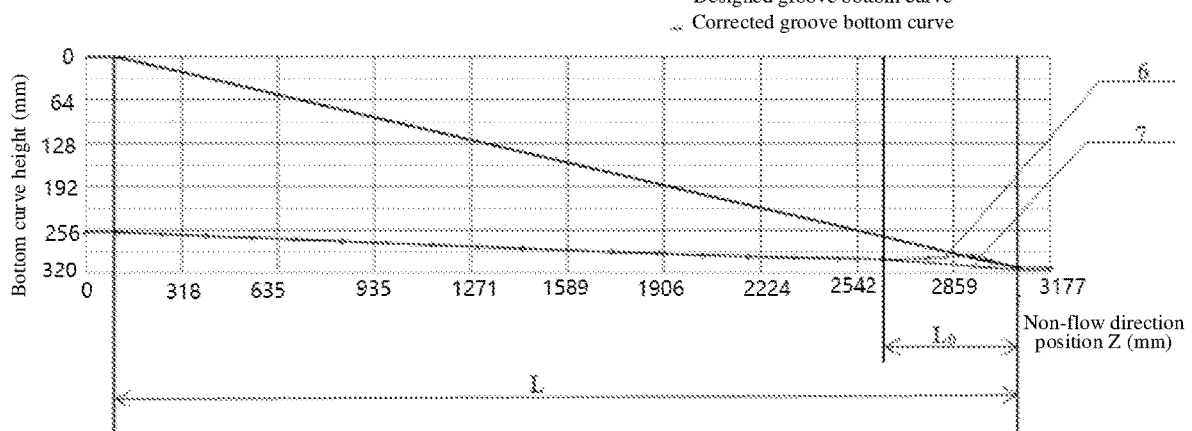
FIG. 5 illustrates an example of design optimization of a groove bottom curve of an overflow brick provided by the present disclosure.

Referring to FIG. 5, FIG. 5 illustrates an example of design optimization of a groove bottom curve of a reference overflow brick provided by the present disclosure. After the overflow brick is optimized, the groove inlet height H is 259.254 mm, the groove inlet width W is 200.032 mm, a length L of the overflow surface is 2973 mm, the inclination angle $\phi_0$ of the overflow weir is 6.0°, and the design output $Q_d$ is 20 ton/day. The extreme thickness difference objective is less than 70 μm. The initial groove bottom curve 6 of the overflow brick and the groove bottom curve 7 of the overflow brick in FIG. 5 are simulated using ANSYS® Fluent® computational fluid dynamics (CFD) simulation tool, with an extreme thickness difference of 68.52 μm totally meeting the design objective. In another example, after the overflow brick is optimized, the groove inlet height H is 265.308 mm, the groove inlet width W is 204.855 mm, the length L of the overflow surface is 2973 mm, the inclination angle $\phi_0$ of the overflow weir is 6.0°, and the design output $Q_d$ is 22 ton/day. The extreme thickness difference objective is less than 70 μm. Through simulation using the ANSYS® Fluent® computational fluid dynamics (CFD) simulation tool, the extreme thickness difference is 67.95 μm totally meeting the design objective.

The above content is only to illustrate the technical ideas of the present disclosure, and cannot be used to limit the protection scope of the present disclosure. Any modification made on the basis of the technical solutions in accordance with the technical ideas proposed by the present disclosure fall into the protection scope of the claims of the present disclosure.

What is claimed is:

1. A method for manufacturing a glass substrate by using an overflow brick, comprising:
   S1: obtaining a standard output of the overflow brick based on design parameters of the overflow brick, wherein the design parameters of the overflow brick comprise a groove inlet height, a groove inlet width, a length of an overflow surface, an inclination angle of an overflow weir, and a design output of the overflow brick;
   S2: obtaining an initial groove bottom curve of the overflow brick based on the design parameters of the overflow brick and the standard output of the overflow brick;
   S3: obtaining a groove bottom curve of the overflow brick through straight line correction of the initial groove bottom curve of the overflow brick based on a length of a splitting block of the overflow brick;
   S4: obtaining an extreme thickness difference of a formed glass substrate through overflow simulation using fluid dynamics simulation software based on the groove bottom curve of the overflow brick and the design parameters of the overflow brick; and
   S5: when the extreme thickness difference of the formed glass substrate is smaller than or equal to a preset threshold, processing the overflow brick based on the groove bottom curve of the overflow brick obtained from S3 and the design parameters of the overflow brick, wherein a groove bottom of the overflow brick is shaped according to the groove bottom curve of the overflow brick; and when the extreme thickness difference of the formed glass substrate is greater than the preset threshold, adjusting the design parameters of the overflow brick and repeating steps S1 to S4,
   wherein the method further comprises:
   connecting the processed overflow brick to a glass melt feeding device; and
   enabling glass melt from the glass melt feeding device to flow into an overflow groove of the overflow brick, and overflow along the overflow groove from two sides of the overflow brick, to form a glass substrate below a root of the overflow brick, wherein the formed glass substrate has an extreme thickness difference of the overall glass substrate less than 15 μm,
   wherein in the step S1, the standard output of the overflow brick is obtained specifically by a method comprising:
   S101: calculating a fluid parameter A of an overflow of a glass in accordance with an equation (1):

$$A = \frac{\rho \times g}{3 \times \eta},\tag{1}$$

where ρ represents a density of the glass, in unit of Kg/m³; g represents an acceleration of gravity, in unit of m/s²; and η represents a forming viscosity of the glass, in unit of poise;

S102: calculating a surface tension parameter B of the glass in accordance with an equation (2):

$$B=\mathrm{Sin}(j)\tag{2},$$

where j represents a contact angle of the glass;
   S103: calculating a standard flow rate C per unit length of an overflow surface of the overflow brick in accordance with an equation (3):

$$C = \frac{Q_s}{2 \times L},\tag{3}$$

where $Q_s$ represents the standard output of the overflow brick, in unit of kg/s; and L represents a length of the overflow surface, in unit of mm;
   S104: calculating an overflow height D of an overflow groove in accordance with an equation (4):

$$D = \sqrt[3]{\frac{C}{A \times B}};\tag{4}$$

S105: calculating a height-width ratio E of the overflow groove in accordance with an equation (5):

$$E = \frac{H + D}{W},\tag{5}$$

where H represents a groove inlet height of the overflow brick, and W represents an inlet width of the overflow groove of the overflow brick;
   S106: calculating a section function F of the overflow groove in accordance with an equation (6):

$$F = 0.6274 \times \tanh\left(\frac{\pi}{4 \times E}\right) + 0.002581893 \times \tanh\left(\frac{3 \times \pi}{4 \times E}\right) + 0.000257234;\tag{6}$$

S107: calculating the standard output $Q_s$ of the overflow brick in accordance with an equation (7):

$$Q_s=A \times \tan \phi \times [W \times (H+D)^3 - 2 \times F \times (H+D)^4]\tag{7}; \text{ and}$$

S108: obtaining the standard output $Q_s$ of the overflow brick by solving the equations (1) to (7) simultaneously.

2. The method for manufacturing the glass substrate by using the overflow brick according to claim 1, wherein the standard output $Q_s$ of the overflow brick is greater than the design output $Q_d$ of the overflow brick.

3. The method for manufacturing the glass substrate by using the overflow brick according to claim 1, wherein the contact angle of the glass is j=21.7°, and the forming viscosity of the glass is η=35000 poise.

4. The method for manufacturing the glass substrate by using the overflow brick according to claim 1, wherein step S2 comprises:
   S201: dividing the length L of the overflow surface of the overflow brick into n equal portions each of which corresponds to a Z value of a groove bottom position, where the Z value is selected from discrete values from 0 to L with an equal interval of L/n, and n is greater than or equal to 5; and
   S202: obtaining a height h of the overflow groove of the overflow brick corresponding to the Z value corresponding to each of the n equal portions of the length L of the overflow surface of the overflow brick by solving the equations (1) to (8) simultaneously, and recording the height h, to obtain the initial groove bottom curve of the overflow brick:

$$2 \times C \times (L-Z) = A \times \tan \emptyset_0 \times [W \times (h+D)^3 - 2 \times F \times (h+D)^4] \qquad (8),$$

where $\emptyset_0$ represents an inclination angle of an overflow weir of the overflow brick.

5. The method for manufacturing the glass substrate by using the overflow brick according to claim 4, wherein the step S3 comprises:

S301: dividing, based on the length $L_0$ of the splitting block of the overflow brick, the length L of the overflow surface of the overflow brick into two sections comprising a section from 0 to $L$-$L_0$ and a section from $L$-$L_0$ to L;

S302: dividing the initial groove bottom curve of the overflow brick obtained in step S2 into two sections comprising a section from 0 to $L$-$L_0$ and a section from $L$-$L_0$ to L, wherein $Z=Z_{L-L_0}$ corresponds to the height of the overflow groove $h=h_{L-L_0}$, and $Z=L$ corresponds to the height of the overflow groove $h=0$; and S303: performing the straight line correction on the initial groove bottom curve of the overflow brick by connecting the height of the overflow groove $h=h_{L-L_0}$ corresponding to $Z=Z_{L-L_0}$ and the height of the overflow groove $h=0$ corresponding to $Z=L$ into a straight line, to obtain the groove bottom curve of the overflow brick.

6. The method for manufacturing the glass substrate by using the overflow brick according to claim 5, wherein the step S5 comprises:

when the extreme thickness difference of the formed glass substrate is smaller than or equal to the preset threshold, processing the overflow brick based on the groove bottom curve of the overflow brick and the design parameters of the overflow brick; and when the extreme thickness difference of the formed glass substrate is greater than the preset threshold, adjusting the inlet width W of the overflow groove of the overflow brick and repeating the step S4, or adjusting the groove inlet height H of the overflow brick and repeating the steps S1 to S4, or adjusting the inlet width W of the overflow groove of the overflow brick and the groove inlet height H of the overflow brick and repeating the steps S1 to S4.

7. An overflow brick formed by processing based on design parameters of the overflow brick and a groove bottom curve of the overflow brick, wherein the design parameters and the groove bottom curve of the overflow brick are obtained by the method for manufacturing a glass substrate by using an overflow brick according to claim 1.

8. An overflow brick formed by processing based on design parameters of the overflow brick and a groove bottom curve of the overflow brick, wherein the design parameters and the groove bottom curve of the overflow brick are obtained by the method for manufacturing the glass substrate by using the overflow brick according to claim 2.

9. An overflow brick formed by processing based on design parameters of the overflow brick and a groove bottom curve of the overflow brick, wherein the design parameters and the groove bottom curve of the overflow brick are obtained by the method for manufacturing the glass substrate by using the overflow brick according to claim 3.

10. An overflow brick formed by processing based on design parameters of the overflow brick and a groove bottom curve of the overflow brick, wherein the design parameters and the groove bottom curve of the overflow brick are obtained by the method for manufacturing the glass substrate by using the overflow brick according to claim 4.

11. An overflow brick formed by processing based on design parameters of the overflow brick and a groove bottom curve of the overflow brick, wherein the design parameters and the groove bottom curve of the overflow brick are obtained by the method for manufacturing the glass substrate by using the overflow brick according to claim 5.

12. An overflow brick formed by processing based on design parameters of the overflow brick and a groove bottom curve of the overflow brick, wherein the design parameters and the groove bottom curve of the overflow brick are obtained by the method for manufacturing the glass substrate by using the overflow brick according to claim 6.

* * * * *